3,637,861
METHOD FOR PRODUCING NOVEL STABILIZERS FOR AQUEOUS FORMALDEHYDE SOLUTIONS AND PRODUCT
Frederic J. Shelton, Tacoma, Wash., assignor to Reichhold Chemicals, Inc., White Plains, N.Y.
No Drawing. Filed Mar. 11, 1970, Ser. No. 18,706
Int. Cl. C07c 47/04
U.S. Cl. 260—606                              5 Claims

ABSTRACT OF THE DISCLOSURE

Novel stabilizers for concentrated aqueous formaldehyde solutions are produced by reacting an organic halogenated silane and a long chain carbohydrate in pyridine. These stabilizers are effective over the temperature range from about 20° C. to about 90° C. The stabilizers of this invention do not exhibit any appreciable foaming and prevent polymer formation at room temperature.

---

This invention relates to formaldehyde and in particular to the stabilization of aqueous solutions of formaldehyde in concentrations ranging from about 30 to about 80%. Concentrated aqueous solutions of formaldehyde are preferred over diluted solutions because diluted solutions are cumbersome to handle and costly to transport. However, as has long been known, aqueous solutions of formaldehyde in concentrations greater than about 30% tend to become cloudy and precipitate formaldehyde polymers unless stabilized or stored between 50°–100° C. Even if stored at these elevated temperatures, the unstabilized concentrated formaldehyde solutions will show polymer formation within a matter of hours. Therefore, stabilizers have been proposed and developed to prevent the formation and/or separation of the formaldehyde polymers at lower storage temperatures. In the past, compounds used for stabilizing concentrated aqueous formaldehyde solutions have had the disadvantage of either being required in such a high concentration as to make them unpractical or being susceptible to a high degree of foaming. The stabilizers of this invention have neither of these drawbacks as they are effective in concentrations as low as 10 p.p.m. and cause a minimum of foaming.

Methyl alcohol has been widely used as a stabilizer for preventing polymer formation. It is present in concentrations ranging from 8 to about 15% in standard commercial 37% aqueous formaldehyde solutions. However, these relatively large quantities are quite unacceptable at times, because they will lead to undesirable properties when the formaldehyde is used in certain reactions.

Other various compounds have been proposed but again, the amount needed is usually prohibitively large so as to effect the end product or to be too expensive. Only a few stabilizers have been found to be effective at very low concentrations, i.e. 10–1000 p.p.m., for an extended period of time. These include high organic polymer colloids (U.S. Pat. No. 3,137,736) and noncolloidal alkyl acrylate homopolymers (U.S. Pat. No. 3,359,326).

Certain carbohydrates e.g. hydroxypropyl cellulose or methylcellulose all have a stabilizing effect. However, their performance leaves much to be desired in that they tend to cause considerable foaming. Although this foaming can be controlled through the addition of a defoamer such as a silicone type defoamer, the quantity of the defoamer required is extremely critical and tends to form nonhomogenous dispersions. Alternatively the quantities required are so large as to interfere with many processes for which the formaldehyde is used. Although there are a great number of organic silicone compounds available, none possess the ability to stabilize formaldehyde solutions alone.

It is, therefore, an object of this invention to produce concentrated aqueous formaldehyde solutions which are stable at room temperature.

It is a further object of this invention to produce novel stabilizers for concentrated aqueous formaldehyde solutions which are effective in very low concentrations and for extended periods of time.

It is still another object of this invention to produce stable aqueous formaldehyde solutions containing no methanol.

And it is yet another object of this invention to produce stable aqueous formaldehyde solutions with low methanol content.

And still another object of this invention is to produce aqueous formaldehyde solutions, which do not induce any material amount of foaming.

These and other objects of this invention will become apparent to those skilled in the art as this description proceeds.

It has now been found that the above objects can be achieved by adding small amounts (from about 10 p.p.m. to about 1000 p.p.m.) of the reaction product of an organic halogenated silane and carbohydrate polymer to concentrated aqueous formaldehyde solutions.

Table I clearly illustrates the unexpected improvements embodied by this invention.

TABLE I
[Comparison of stability and antifoam abilities]

| | Stability | | Foam test (mm. of foam) | | | |
|---|---|---|---|---|---|---|
| | 2 days at 50° C. | 2 days at 40° C. | Directly after shaking | 4 min. | 10 min. | 3 days |
| (A) Hydroxypropylmethyl cellulose | Clear | Cloudy, 1 mm. ppt | 27 | 27 | 15 | 10 |
| (B) Trimethylchlorosilane | 5 mm. ppt. on bottom | Cloudy, 8 mm. ppt | None | None | None | None |
| (C) Mixture of hydroxypropylmethyl cellulose and trimethylchlorosilane. | Clear | Cloudy, 3 mm. ppt. on bottom. | 25 | 25 | 15 | 8 |
| (D) Hydroxypropylmethyl cellulose trimethylchlorosilane.[1] | Clear | Less cloudy, 1 mm. ppt; on bottom. | | None | None | None |
| (E) Blank control (no stabilizer) | 5 mm. ppt. on bottom | Cloudy, 10 mm. ppt | | None | None | None |

[1] Prepared as per Example VI.

Test solutions.—A through D were prepared by taking 100 grams of 53% formaldehyde and treating it with 0.01 gram of the subject material.
Stability.—Jars containing treated formaldehyde were stored on our oven at constant temperature and observed.
Foam test.—Standard test tubes containing equivalent amounts of solution were shaken for 15 seconds and then stored in an oven at 50° C. and the rate of foam dispersion was observed.

Solution A, which includes only hydroxypropylmethyl cellulose as a stabilizer has fairly good stability properties namely one mm. precipitate and cloudy after two days storage at 50° C. but foams considerably (27 mm.) and still retains a 10 mm. head of foam after three days. Solution B is trimethylchlorosilane alone and produces no foam during the foam test but is not effective as a stabilizer, allowing 5 mm. of precipitate after two days of storage at 50° C. and 8 mm. of precipitate and a cloudy solution after two days of storage at 40° C.

Test solution C is a mol for mol mixture of hydroxypropylmethyl cellulose and trimethylchlorosilane. This solution gave fairly good stabilization; no precipitation after two days storage at 50° C. but was cloudy and had 3 mm. precipitate after two days storage at 40° C. However, this solution gave large amounts of foam, 25 mm., which persisted and still retained 8 mm. of foam after standing for three days.

When test solution D was prepared, which is the reaction product of hydroxypropylmethyl cellulose and trimethylchlorosilane, totally unexpected results were obtained. Stability was greatly improved, now having no precipitate after two days storage at 50° C. and only one mm. of precipitate after being stored for two days at 40° C. with no cloudiness. Foaming was almost entirely eliminated having only fifteen mm. of foam directly after shaking which disappeared completely in less than four minutes. The stability as compared to hydroxypropylmethyl cellulose alone or in a mixture increased considerably and the foaming was almost completely eliminated as compared to organic halogenated silanes alone or in a mixture. These results were surprising and indeed unobvious.

In a typical reaction of this invention, an organic halogenated silane is added dropwise to methylcellulose in a solvent. After a short period of time, the mixture is removed from the reaction vessel and the solvent is allowed to evaporate. The remaining reaction product is then ready to be used to stabilize formaldehyde solutions.

The organic halogenated silane may include trimethylchlorosilane, trimethylbromosilane, trichlorosilane, tetrachlorosilane, methyltrichlorosilane, phenyldimethylchlorosilane, trimethylfluorosilane, triethylchlorosilane, diphenyl methylchlorosilane and so forth. However, for the preferred practice of this invention trimethylchlorosilane is used because of the outstanding results obtained therefrom.

For the long chain carbohydrate moiety cellulose ethers may be used such as methylcellulose, ethylcellulose, propylcellulose, sodium carboxymethylcellulose, hydroxymethyl celulose, hydroxyethylcellulose, hydroxypropylcellulose hydroxypropylmethylcellulose, hydroxyethylmethylcellulose, ethylhydroxyethylcellulose, cyanoethylcellulose, benzylcellulose, sodium carboxymethyhydroxyethylcellulose and the like. Again, because of superior results obtained hydroxypropylmethyl cellulose is favored.

In the preferred practice of this invention hydroxypropylmethyl cellulose is mixed with anhydrous pyridine at a temperature of about 20° C. To this mixture trimethylchlorosilane is added dropwise with constant stirring. After all the trimethylchlorosilane is added stirring is continued for a short period and then the product is poured onto an evaporating dish where the pyridine is evaporated off. The resulting material, when mixed with water, is then ready for use as a formaldehyde stabilizer.

The concentrated aqueous formaldehyde solutions to be stabilized may be prepared by any of the methods well known to the art.

The following detailed descriptions and examples are presented to further illustrate this invention and are not intended to limit it to the particular details set forth therein.

EXAMPLE I

Two grams of hydroxypropylmethyl cellulose is mixed into 30 ml. of anhydrous pyridine. One gram of trimethylchlorosilane is then added dropwise with stirring into the hydroxylpropylmethyl cellulose-pyridine mixture. After stirring for about five minutes the reaction is completed and the jelly-like solution is poured out on a dish where the pyridine is evaporated off. The resulting white product is dissolved in enough distilled water to make a 2% solution. This solution is then suitable for use as a formaldehyde stabilizer.

A freshly prepared aqueous solution of 52% formaldehyde was divided into 100 gm. samples. To different samples were added different amounts of the aqueous solution from above. To the control sample nothing was added. All of the samples were allowed to stand for four weeks at 45° C. The samples were periodically checked for cloudiness and precipitate formation. The results obtained are set forth in Table II.

TABLE II
[Results of 52% formaldehyde stabilized with various amounts of the trimethyl silane-hydroxpropylmethyl cellulose]

| Percent concentrate | Day 1 | Day 3 | Day 5 | Day 12 | Day 18 | Day 28 |
|---|---|---|---|---|---|---|
| 0.1 | Clear | Clear | Clear | Clear | Clear | Cloudy. |
| 0.05 | do | do | do | do | do | Do. |
| 0.01 | do | Hazy | Cloudy, trace ppt | Cloudy ppt | Cloudy ppt | Clear, 1/16" ppt. |
| 0.005 | do | Cloudy | do | Cloudy, 1/16" ppt | 1/16" ppt. cloudy | Do. |
| 0.001 | do | Cloudy, trace ppt | 1/2" ppt | Clear, 1/4" ppt | Clear, 1/4" ppt | Clear, 1/4" ppt. |
| None (cloudy after 1 hr.) (Control). | Clear, 1/2" ppt | 3/4" ppt., clear | 3/4" ppt., clear | 7/8" ppt., clear | 7/8" ppt., clear | 1" ppt., clear. |

EXAMPLE II

A 2% aqueous solution of hydroxypropylmethyl cellulose was prepared. More of the same formaldehyde as was used in Example I was divided into 100 gm. samples. To different samples were added different amounts of the freshly prepared hydroxypropylmethyl cellulose. The same concentrations were used as were used in Example I and the results were compared. The stabilized formaldehyde solutions of Example I were much less foamy when shaken than those of Example II.

EXAMPLE III

Ten grams of methyl cellulose were mixed into 150 ml. of anhydrous pyridine. Ten grams of trimethylchlorosilane were then added dropwise with stirring into the methylcellulose pyridine mixture. After stirring for about 5 minutes the reaction was completed and the jelly-like solution poured out on a plate where the pyridine was evaporated off. The resulting product was dissolved in enough water to make a 1% solution. This solution was then ready for use as a formaldehyde stabilizer.

A freshly prepared aqueous solution of 52% formaldehyde was divided into 100 gm. samples. To different samples were added different amounts of a freshly prepared aqueous solution from avove. To the control nothing was added. All of the samples were then stored at 45° C. The samples were periodically checked for cloudiness and precipitate formation. The results are set forth in Table III.

TABLE III

[Results of 52% formaldehyde stabilized with various amounts of the trimethylchlorosilane-methylcellulose stabilizer]

| Percent concentrate | Day 1 | Day 4 | Day |
|---|---|---|---|
| 0.01 | Clear | Trace ppt., cloudy | 1/16" ppt., clear. |
| 0.005 | do | 1/4" ppt., cloudy | 5/16"' ppt., clear. |
| None (control) | 1/4" ppt., cloudy | 5/8" clear ppt | 3/4" ppt., clear. |

EXAMPLE IV

A 1% aqueous solution of methylcellulose was prepared. More of the same formaldehyde as was used in Example II was divided into 100 gm. samples. To the samples were added different amounts of the freshly prepared methyl cellulose solution. The same concentrations were used as were used in Example II and the results were compared. The stabilized formaldehyde solutions of Example III were less foamy when shaken than those in Example IV and were less viscous and easier to handle.

EXAMPLE V

Five grams (0.02 mol) of hydroxypropylmethyl cellulose and 2.2 grams (0.02 mol) of trimethylchlorosilane are charged into a moisture free reaction flask containing 60 ml. of dry toluene. The mixture is suspended with stirring and three drops of pyridine are added. The reaction mixture is slowly heated to about 90° C. During the heat up time HCl gas is detected in the off gas. At this point the reaction mixture has turned dark brown. The heat is removed and the reaction is allowed to cool. The product is collected on a filter and washed with fresh dry toluene. The product is a very water soluble brown powder.

EXAMPLE VI

Five grams (0.02 mol) of hydroxypropylmethyl cellulose and 2.2 grams (0.02 mol) of trimethylchlorosilane are charged into a moisture free reaction flask containing 50 ml. of dry toluene. The mixture is suspended with stirring and 1–6 grams (0.02 mol) of pyridine is added and the temperature of the reaction mixture is noted to rise. The suspension becomes noticeably thicker and HCl gas is noted in the off gas. After stirring for 30 minutes the white water soluble product is collected on a filter.

The invention has been described in detail for the purpose of illustration but it will be obvious to those skilled in the art that numerous modifications and variations may be resorted to without departing from the spirit of the invention in its broadest aspects.

What is claimed is:

1. An aqueous solution of formaldehyde containing as a stabilizer the reaction product recovered from the reaction mixture obtained by reacting (A) an organic halogenated silane and (B) a long chain carbohydrate, in the presence of pyridine, at a temperature ranging from about 20° C. to about 90° C.

2. An aqueous solution of formaldehyde as defined in claim 1 wherein (A) is at least one member of the group consisting of trimethylchlorosilane, trimethylbromosilane, trichlorosilane, tetrachlorosilane, methyltrichlorosilane, phenyldimethylchlorosilane, diphenylmethylchlorosilane, trimethylfluorosilane and triethylchlorosilane and mixtures thereof.

3. An aqueous solution of formaldehyde as defined in claim 2 wherein (A) is trimethylchlorosilane.

4. An aqueous solution of formaldehyde as defined in claim 1 wherein (B) is at least one member of the group consisting of methylcellulose, ethylcellulose, propylcellulose, sodium carboxymethylcellulose, hydroxymethyl cellulose, hydroxyethylcellulose, hydroxypropylcellulose, hydroxypropylmethylcellulose, hydroxyethylmethylcellulose, ethylhydroxyethylcellulose, cyanoethyl cellulose, benzylcellulose and sodium carboxymethylhydroxyethylcellulose and mixtures thereof.

5. An aqueous solution of formaldehyde as defined in claim 4 wherein (B) is hydroxypropylmethylcellulose.

References Cited

UNITED STATES PATENTS 3,532,756  10/1970  Prinz et al. _____ 260—606

FOREIGN PATENTS 20,613  12/1966  Japan _____ 260—606

LEON ZITVER, Primary Examiner

R. H. LILES, Assistant Examiner

U.S. Cl. X.R.

260—231